United States Patent [19]

Rubinfeld

[11] Patent Number: 4,814,981
[45] Date of Patent: Mar. 21, 1989

[54] CACHE INVALIDATE PROTOCOL FOR DIGITAL DATA PROCESSING SYSTEM

[75] Inventor: Paul Rubinfeld, Wayland, Mass.

[73] Assignee: Digital Equipment Corporation, Maynard, Mass.

[21] Appl. No.: 908,825

[22] Filed: Sep. 18, 1986

[51] Int. Cl.⁴ .................. G06F 13/00; G06F 13/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,161,024 | 7/1979 | Joyce et al. | 364/200 |
| 4,161,782 | 9/1979 | Joyce et al. | 364/200 |
| 4,195,340 | 3/1980 | Joyce | 364/200 |
| 4,249,250 | 2/1981 | Scowen | 365/230 |
| 4,349,871 | 9/1982 | Lary | 364/200 |
| 4,419,725 | 12/1983 | George et al. | 364/200 |
| 4,426,682 | 1/1984 | Riffe et al. | 364/200 |
| 4,439,829 | 3/1984 | Tsiang | 364/200 |
| 4,458,310 | 7/1984 | Chang | 364/200 |
| 4,464,712 | 8/1984 | Fletcher | 364/200 |
| 4,471,429 | 9/1984 | Porter et al. | 364/200 |
| 4,567,578 | 1/1986 | Cohen et al. | 365/189 |
| 4,607,331 | 8/1986 | Goodrich et al. | 364/200 |
| 4,648,030 | 3/1987 | Bomba et al. | 364/200 |
| 4,654,819 | 3/1987 | Stiffler et al. | 364/200 |

Primary Examiner—Archie E. Williams, Jr.
Assistant Examiner—Ayni Mohamed
Attorney, Agent, or Firm—Fish & Richardson

[57] ABSTRACT

A mechanism for determining when the contents of a block in a cache memory have been rendered stale by DMA activity external to a processor and for marking the block stale in response to a positive determination. The commanding unit in the DMA transfer, prior to transmitting an address, asserts a cache control signal which conditions the processor to receive the address and determine whether there is a correspondence to the contents of the cache. If there is a correspondence, the processor marks the contents of that cache location for which there is a correspondence stale.

7 Claims, 3 Drawing Sheets

CACHE INVALIDATE PROTOCOL FOR DIGITAL DATA PROCESSING SYSTEM

BACKGROUND OF THE INVENTION

1. Field of the Invention

The invention relates generally to the field of digital data processing systems and more specifically to systems for marking as stale entries in processor cache memory circuits which include data for which the data stored in main memory has been overwritten by other units in the system.

2. Description of the Prior Art

A typical digital data processing system includes three basic elements, namely a processor element, a memory element, and an input/output element. The memory element stored information in addressable storage locations. This information includes both data and instructions for processing the data. The processor element includes one or more digital data processing units, or "processors", each of which causes information to be transferred, or fetched, to it from the memory element, interprets the incoming information as either instructions or data, and processes the data in accordance with the instructions. The results are then stored in addressed locations in the memory element.

The input/output element also communicates with the memory element in order to transfer information into the system and to obtain the processed data from it. Units comprising the input/output element normally operate in accordance with control information supplied to it by the processor element. The control information defines the operation to be performed by the input/output unit. At least one class of operations performed by an input/output unit is the transfer of user information, that is, information used by a user program, between the input/output unit and the memory element. Typical units comprising the input/output element include, for example, printers, teletypewriters, and video display terminals, and may also include secondary information storage devices such as disk or tape storage units.

In addition to functioning as input/output devices, disk storage units and, under some circumstances, tape storage units may also function as part of the memory element. In particular, a memory element typically includes a main memory, whose contents are accessible to the processor relatively quickly but which is generally relatively high-cost storage. Modern main memories are typically implemented using MOS or bipolar semiconductor technology and may provide on the order of a fraction of a megabyte to several tens of megabytes of storage.

On the other hand, the time required to access information stored in disk storage units is much longer than main memory, but the disk units can provide large amounts of storage, on the order of hundreds of megabytes or more, at relatively low cost. In addition, unlike main memory, disk storage is non-volatile, that is, the information is not lost if power is removed. Therefore, disk units are used to provide backup storage for the main memory, that is, to provide storage for information which will not fit into main memory until a program needs it. When a program requires information which is stored on a disk but is not in the main memory, that information is transferred into the main memory. If necessary, the contents of the locations in the main memory into which the information from the disk unit was transferred may be transferred to a disk unit for storage therein before being overwritten by data from the disk.

In many digital data processing systems, the processor (assuming only one processor), mass storage devices and other input/output devices all communicate with a single main memory or only a few main memory modules. This may produce contention for the main memory which can interfere with the processor's ability to quickly obtain information from the main memory. This, in turn, can slow the processor's ability to execute programs. The contention problem is exacerbated if all of the units are connected to a single input/output bus, as all information that is transferred must be transferred over the single bus.

Accordingly, in many modern computer systems, the processor includes a cache memory, which is a small private memory accessible only to the processor which stores information from the most recently-requested locations in main memory and from nearby locations. In typical data processing systems, when the processor requests an item of information from a location in the main memory, it will oftentimes require the contents of adjacent locations shortly thereafter. Accordingly, when the processor is able to request information from the main memory, it requests more than it needs at that immediate time, with the expectation that it will likely need at least some of the remaining information shortly thereafter. When the processor gets the item information it then needs, it can immediately begin using it, and if it turns out that the the processor can use the other information that was received, it will have that information stored in the cache, and will not have to wait until it is obtained from the main memory.

Typically a cache memory is organized into blocks each capable of storing a predetermined amount of information. When information has been retrieved from main memory and loaded into a cache block, that block is assigned an address, termed a "tag". The tag corresponds to the address of the corresponding locations in main memory from which the information was retrieved; thus the blocks of the cache are identified with the locations in the main memory. When the processor requires information, the tags in the cache can be examined to determine whether a block contains the requested information. If one does, the information is obtained from the cache; otherwise, the processor retrieves the information from the main memory.

As has been mentioned, when a disk unit transfers information to the main memory, it may overwrite information which was previously in the main memory. When that occurs, however, if information has been stored in one or more blocks in the cache from those locations in main memory, the information in those blocks is stale, that is, the blocks do not contain copies of the information in the memory.

SUMMARY OF THE INVENTION

The invention provides a new and improved mechanism for marking as stale blocks in a cache memory so as to indicate that the contents of the main memory associated with those blocks have been changed since the information was stored in the cache.

In brief summary, a digital data processing system includes a processor including a cache memory controlled by a bus interface circuit. The processor communicates with a main memory and one or more secondary information storage units over a common bus. The bus includes lines for transferring addresses and information, an address strobe signal identifying when addresses are being transferred, and a line for transferring a cache control signal. If the cache control signal is asserted immediately prior to the transfer of the address over the address lines and the assertion of the address strobe signal, the bus control circuit compares the address with the addresses associated with the contents of the cache memory. If a block in the cache memory is associated with the address transferred, the bus control circuit marks as stale the contents of the cache block. A second block, which is associated with main memory locations adjacent the block just marked stale may also be marked stale if the cache control signal is associated a second time while the address strobe signal is asserted.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
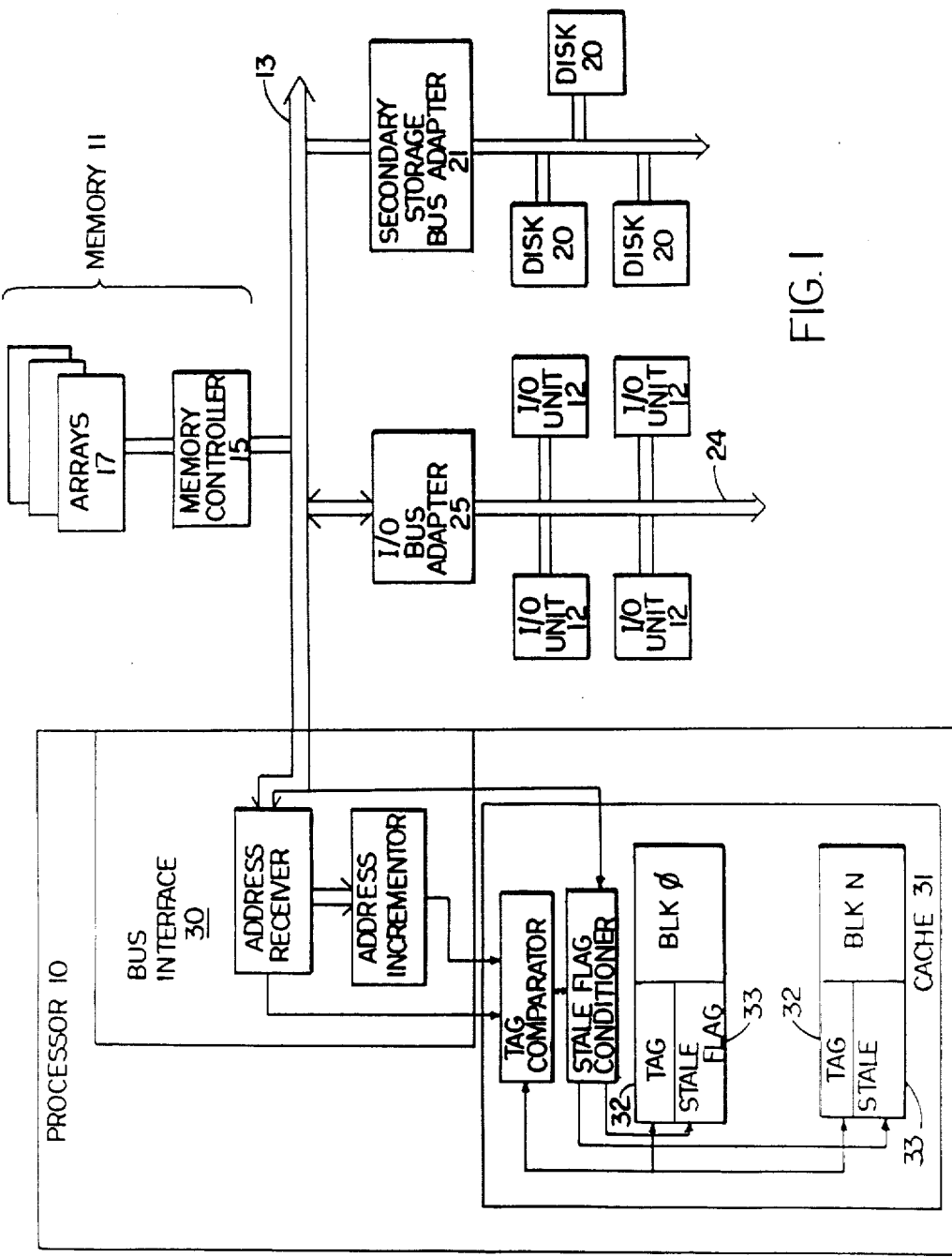
FIG. 1 is a block diagram of a digital data processing system constructed in accordance with the invention.

Referring to FIG. 1, a data processing system including the invention includes, as basic elements, a processor 10, a memory 11 and one or more input/output units 12. A bus 13 interconnects the processor 10, memory 11 and input/output units 12 in parallel. The processor 10 executes instructions that are stored in addressable storage locations in the memory unit 11. The instructions identify operations that are to be performed on operands, which are also stored in addressable locations in the memory unit. The instructions and operands are fetched by the processor 10 as they are needed, and processed data are returned for storage in the memory 11. The processor 10 also transmits control information to the input/output units 12, enabling them to perform selected operations, such as transmitting data to or retrieving data from the memory 11. Such data may include instructions or operands which may be transmitted to the memory 11 or processed data which is retrieved from the memory 11 for storage or display.

An operators console 14 serves as the operator's interface. It allows the operator to examine and deposit data, halt the operation of the processor 10 or step the processor 10 through a sequence of instructions and determine the responses of the processor 10 in response thereto. It also enables an operator to initialize the system through a boot strap procedure, and perform various diagnostic tests on the entire data processing system.

The memory 11 includes a memory controller 15, which is connected directly to the bus 13 and to a plurality of arrays 17. The arrays 17 contain a plurality of addressable storage location in which information is stored. The memory controller 15 receives transfer requests from the processor 10 or from an input/output unit 12 over the bus 13. The memory controller 15 may receive several types of transfer requests over bus 13, which fall into two general categories. In one category, information is written into, or stored in, a storage location, and in the other category, information is retrieved, or read, from a storage location.

The data processing system may include several types of input/output units 12, including disk and tape secondary storage units, teletypewriters, video display terminals, line printers, telephone and computer network units, and the like. All of these units communicate with the bus 13 over a device bus through one or more bus adapters. As shown in FIG. 1, the disk drives 20 are connected to a secondary storage bus adapter 21 over a device bus 22. The secondary storage bus adapter 21 is, in turn is connected to bus 13. Others of input/output units 12 are connected to an input/output bus adapter 25 over a device bus 24.

Transfers by the processor 10 over bus 13 are controlled by a bus interface circuit 30. The bus interface circuit 30 transmits and receives signals, as described in part below in connection with FIG. 2, which, at the request of the processor's processing circuits (not shown) effect a transfer of information over bus 13 with the other units connected thereto. The bus interface circuit 30 also controls a cache memory 31, storing information therein received from the memory unit 11 over bus 13. In addition, if the processing circuits have requested information which is stored in the cache memory 31, the bus interface circuit 30 retrieves the information and transfers it to the processing circuits.

Cache memory 31 is a conventional information storage circuit in a processor 10. Cache memories are described in K. Hwang and F. Briggs, Computer Architecture And Parallel Processing (McGraw-Hill, 1984), Section 2.4, pp. 98, et seq, and V. Hamacher, Computer Organization (McGraw-Hill, 1984), Section 8.6, pp. 306, et seq. Cache memory 31 includes a plurality of storage locations organized into blocks, with each block containing two storage locations. Each storage location stores one word of information, that is, the amount of information which may be transferred over bus 13 at one time. In one specific embodiment, a word of information corresponds to four bytes, or thirty-two binary digits, of information. Thus, a block includes storage locations for eight bytes of information.

As will be appreciated by those skilled in the art, the information stored in a block in the cache memory 31, when it is received from the memory unit 11, is a copy of the information stored in the memory unit 11. Each block in the cache memory 31 has an associated tag 32 whose contents are established by the bus interface circuit 30 to identify the locations in the memory unit 11 from which the information was copied. In addition, each block includes a stale flag 33 which is reset or cleared by the bus interface circuit to indicate whether or not the contents of the block are in fact copies of the locations identified by the tag, that is, whether or not the contents of the block are stale.

Circumstances under which the contents of a block may be marked stale are well known. At least one such circumstance is when another unit connected to bus 13 transfers information to memory unit 11 for storage in a location whose contents have previously been copied into a block in the cache memory 31. If that occurs, the contents of the block in the cache memory 31 are "stale", that is, they no longer correspond to the contents of the locations in memory unit 11, and so the processor 10 cannot use the information in that block of the cache memory 31. In the above-described embodiment in which a cache block has two storage locations, if the contents of either location do not correspond to the contents of the corresponding location in memory, that block is marked stale.

Figure 2:
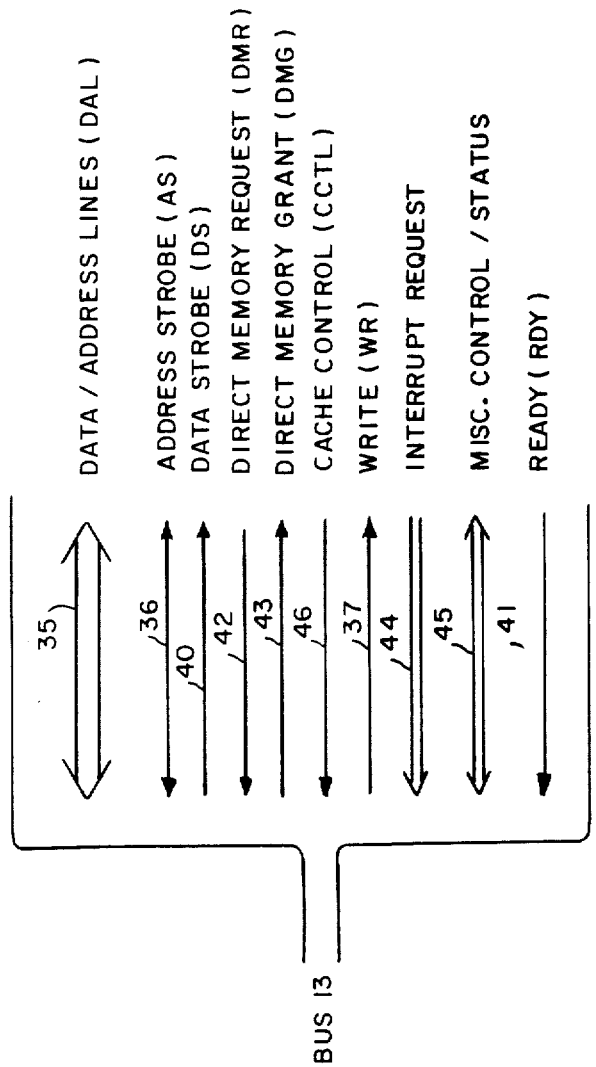
FIG. 2 is a diagram depicting various lines of a bus which is used in connecting various units in the system depicted in FIG. 1

Bus 13 includes a plurality of lines for carrying signals among the various units connected thereto. It will be appreciated that each of the units includes circuits (not shown) for either receiving and using, or transmitting, some or all of the signals. FIG. 2 depicts a number of the lines comprising one embodiment of bus 13.

With reference to FIG. 2, bus 13 includes a set of data/address lines ("DAL") 35 over which a commanding unit transmits signals representing information and transfer command/address are transferred. In bus 13, the transfer command signals, that is, the signals identifying the number of words to be transferred in response to the command, are transferred with the address. Only one address is transferred even if more than one word of information is to be transferred; if more than one word is to be transferred in response to the command, the first word is associated with the location identified by the address, and additional words are taken from locations identified by successive addresses.

After the commanding unit has placed address signals on the data/address lines 35 and allowed them to settle and deskew, it transmits an asserted AS address strobe signal over a line 36. Other units may use the asserted AS address strobe signal to strobe in, and use, the address signals. If the unit transmitting the address also transmits a WR write signal over a line 37 to enable a WRITE operation, that is a transfer of information to the location identified by the address just transmitted. A predetermined time after asserting the AS address strobe signal, the commanding unit removes the command and address signals from the data/address lines 35 and places information signals thereon. A selected time later, after the information signals have been allowed to settle and deskew, the unit transmits an asserted DS data strobe signal over a line 40, enabling the unit containing the addressed location, that is, the responding unit, to receive the data and store the information in the addressed location. The responding unit then transmits an asserted RDY ready signal over a line 41, which is received by the transmitting unit. The DS data strobe and AS address strobe signals are then negated. The responding unit then negates the RDY ready signal.

If, on the other hand, the commanding unit, that is, the unit which transmitted the address signals on the data/address lines, does not assert the WR write signal, a read operation is enabled in which the responding unit transmits the information stored in that location over the data/address lines 35. In particular, the commanding unit, removes the address signals at some time after the AS address strobe signal has been asserted, and asserts the DS data strobe signal. The responding unit then places the information signals from the location identified by the address on the data/address lines 35, and asserts the RDY ready signal. In response, the commanding unit strobes the signals on the data/address lines 35, negates the DS data strobe and AS address strobe signals and the responding unit negates the RDY ready signal.

As has been described above, multiple words of information may be transferred over bus 13 in response to a single address. This is accommodated by the commanding unit maintaining the AS address strobe signal asserted, and, for each word to be transferred, asserting the DS data strobe signal. If the operation is a WRITE operation, the commanding unit transmits a new information word for each asserted DS data strobe signal, and the receiving unit asserts the RDY ready signal in response thereto. After the receiving unit negates the ready RDY signal, the commanding unit may transmit a new information word and assert the DS data strobe signal.

If the operation is a READ operation, after the commanding unit transmits the DS data strobe signal, the receiving unit places a new information word onto the data/address lines 35 and asserts the RDY signal. After the receiving unit negates the RDY signal, the commanding unit may again assert the DS data strobe siganl.

A commanding unit may be any unit which initiates transfers to or from the memory unit. In the digital data processing system depicted in FIG. 1, the processor 10 and secondary storage bus adapter 21 initiate transfers with memory unit 11. In addition, under some circumstances, input/output bus adapter 25 may also initiate transfers with memory unit 11. Adapters 21 and 25 thus have direct access to memory unit 11, that is, they engage in "direct memory access", or "DMA", transfers. If either adapter 21 or 25 wish to make DMA transfers with memory, they engage in an arbitration operation in which processor 10 determines whether a DMA transfer should take place. The unit wishing to make a DMA transfer transmits an asserted DMR direct memory request signal over a line 42; in response, the processor 10 asserts a DMG direct memory grant signal over a line 43. The unit receiving the DMG direct memory grant signal may then become the commanding unit on bus 13.

In addition to the above-described signals, bus 13 includes a number of lines 44 for carrying signals by which other units in the system can request interrupt service or otherwise signal the occurrence of unusual events, and other lines 45 for carrying miscellaneous control and timing signals.

Furthermore, in accordance with the invention, the bus 13 includes a line 46 for carrying a CCTL cache control signal which may be asserted by a commanding unit during a DMA transfer, that is, a unit such as adapters 21 or 25 which transfer information signals to memory unit 11 directly over bus 13. The commanding unit uses the CCTL cache control signal in conjunction with signals transmitted over other lines of the bus 13 to enable bus interface circuit 30 to (a) determine whether the contents of the addressed location identified by the address signals over the data/address lines 35 have been copied into a block in the cache memory 31 by comparing the address signals to the contents of the tags 32, and, (b) if there is a correspondence between the address signals and the cache tags 32, that is, if they have been copied into a block, set the stale flag 33 of that block to indicate that the corresponding location in memory unit 11 has been overwritten. While the bus interface circuit 30 is performing these operations, the commanding unit and the addressed unit may continue with an information transfer over the bus 13 using the data/address lines 35 and the DS data strobe signal as described above. Thus, by asserting the CCTL cache control signal if the information being transferred is information which normally could have been loaded into the cache, in conjunction with the other signals on bus 13, the commanding unit is able to both initiate an information transfer over the bus 13, and also enable the bus interface circuit 30 to perform the operations described above.

Figure 3A:
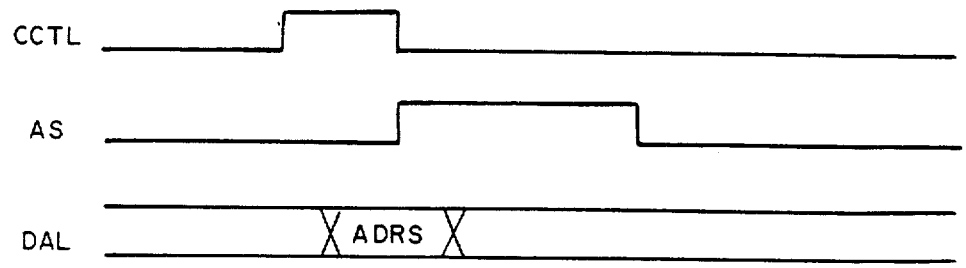
FIG. 3, comprising FIGS. 3A and 3B, includes timing diagrams useful in understanding the operation of the system depicted in FIG. 1.
Figure 3B:
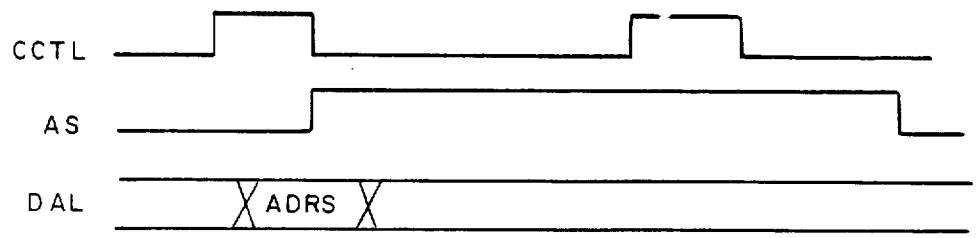

FIGS. 3A and 3B depict the timings for the various signals, including the CCTL cache control signal on line 46 (FIG. 2). FIG. 3A depicts the timing related to a transfer in which one block of a cache may be marked stale, and FIG. 3B depicts the timing related to a transfer in which multiple blocks may be marked stale. As described above, a commanding unit may effectuate information transfers with multiple storage locations in response to a single address transfer by maintaining the AS address strobe signal asserted. If this occurs, the bus interface circuit 30 may have to mark multiple blocks of the cache memory 31 (FIG. 1) stale.

With reference to FIG. 3A, the CCTL cache control signal is asserted by the commanding unit before it places the address signals onto the data/address lines and before it asserts the AS address strobe signal. This conditions the bus interface circuit to expect an address which it should compare to the contents of the cache tags 32. The commanding unit, which is either adapter 21 or 25 in the embodiment depicted in FIG. 1, then places the address signals on the data/address lines 35 and asserts the AS address strobe signal. About the time that the commanding unit asserts the AS address strobe signal, it may negate the CCTL cache control signal.

In response to the assertion CCTL cache control signal, the processor 10, specifically bus interface circuit 30, is conditioned to strobe the address signals from data/address lines 35 when the AS address strobe signal is asserted. After strobing the address signals, bus interface circuit 30 compares them to the contents of tags 32 and, if there is a correspondence, sets the stale flag 33 associated with the block for which there was a correspondence to mark the block stale.

If, as depicted in FIG. 3B, the CCTL cache control signal is asserted a second time while the AS address strobe signal is asserted, the bus interface circuit 30 will determine if a correspondence exists between a block in the cache 31 and a second address related to the address signals that were initially transmitted over the data/address lines 35. In particular, in the embodiment in which a block contains storage locations for two locations in memory unit 11, the second address is taken as the address of the adjacent block in memory. When the CCTL cache control signal is asserted the second time, the bus interface circuit 35 determines whether a correspondence exists between the tags 32 and an address comprising the address received over the data/address lines 35 incremented by two.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A unit for connection to a bus in a digital data processing system including at least one other unit connected to said bus, the unit including a cache memory having a plurality of entries each comprising a block, a tag store and a stale indicator having a valid condition and a stale condition, said unit further including bus interface circuit for connection to said bus for receiving address signals, an address control signal having an asserted condition and a negated condition, and a cache control signal having an asserted condition and a negated condition over respective lines of said bus, said bus interface circuit further being connected to said cache memory means and including:
 A. an address receiving circuit connected to said bus responsive to said address control signal for receiving said address signals;
 B. a tag comparator connected to said address receiving circuit and all of said tag stores for determining if a correspondence exists between said address signals and the contents of said tag stores in response to the receipt of a first cache control signal and between incremented address signals and the contents of said tag stores in response to the receipt of a second cache control signal; and
 C. a stale indicator conditioning circuit connected to said tag comparator and said bus responsive to the receipt of said cache control signal and a positive correspondence for conditioning the stale indicator of the entry having the positive correspondence to said condition.

2. A unit as defined in claim 1 in which said tag comparator includes an address incrementor for generating an increment address value in response to the second receipt of said cache control signal, said tag comparator determining if a correspondence exists between the increment address value and the contents of a tag store and said stale flag conditioning circuit being responsive to a positive correspondence for conditioning the stale indicator of the entry having the positive correspondence to said stale condition.

3. A digital data processing system including a unit and at least one other device interconnected by a bus, the unit including a cache memory means having a plurality of entries each comprising a block having a tag store and a stale indicator having a valid condition and a stale condition, said unit further including bus interface circuit means for connection to said bus for receiving address signals, an address control signal, and a cache control signal over respective lines of said bus, said bus interface circuit means further being connected to said cache memory means and including:
 A. an address receiving circuit connected to said bus responsive to said address control signal receiving said address signals;
 B. a tag comparator connected to said address receiving circuit and all of said tag stores for determining if a correspondence exists between said address signals and the contents of said tag stores in response to the receipt of a first cache control and between incremented address signals and the contents of said tag stores in response to the receipt of a second cache control signal; and
 C. a stale indicator conditioning circuit connected to said tag comparator and said bus responsive to the receipt of said cache control signal and a positive correspondence for conditioning the stale indicator of the entry having the positive correspondence to said stale condition.

4. A system as defined in claim 3 in which said comparator includes an address incrementor for generating an increment address value in response to the second receipt of said cache control signal, said tag comparator determining if a correspondence exists between the increment address value and the contents of a tag store and said flag conditioning circuit being responsive to a positive correspondence for conditioning the stale indicator of the entry having the positive correspondence to said stale condition.

5. A unit for connection to a bus, the unit including a cache memory having a plurality of entries each comprising a block, a tag store and a stale indicator having a valid condition and a stale condition, said unit further including bus interface circuit for connection to said bus for receiving address signals, an address control signal, and a cache control signal over respective lines of said bus, said bus interface circuit further being connected to said cache memory and including:
- A. an address store connected to said bus and responsive to said control signal having an asserted condition for receiving said address signals;
- B. an address increment circuit for enabling said address store to generate first address signals in response to a first assertion of the cache control signal and second address signals in response to a second assertion of the cache control signal while the address control signal remains asserted;
- C. a tag comparator connected to said address store and all of said tag stores for determining if a correspondence exists between said first and second address signals and the contents of all of said tag stores in response to the coincidence of the assertions of said cache control signal while said address control signal is asserted; and
- D. a stale flag conditioning circuit connected to said tag comparator and said bus responsive to the receipt of said cache control signal a positive correspondence for conditioning the stale indicator of the entry having the positive correspondence to said condition.

6. A digital data processing system including a unit and at least one other device interconnected by a bus, the unit including a cache memory having a plurality of entries each comprising a block a tag store and a stale indicator having a valid condition and a stale condition, said unit further including bus interface circuit for connection to said bus for receiving address signals, an address control signal, and a cache control signal over respective lines of said bus, said bus interface circuit further being connected to said cache memory and including:
- A. an address store connected to said bus and responsive to said address control signal having an asserted condition for receiving said address signals;
- B. an address increment circuit for enabling said address store to generate first address signals in response to a first assertion of the cache control signal and second address signals in response to a second assertion of the cache control signal while the address control signal remains asserted;
- C. a tag comparator connected to said address store and all of said tag stores for determining if a correspondence exists between said first and second address signals and the contents of said tag store in response to the coincidence of the assertions of said cache control signal while said address control signal is asserted; and
- D. a stale flag conditioning circuit connected to said tag comparator and said bus responsive to the receipt of said cache control signal and a positive correspondence for conditioning the stale indicator of the entry having the positive correspondence to said stale condition.

7. A method of establishing the condition of entries in a cache memory connected to a bus in a digital data processing system including at least one other unit connected to said bus, said cache memory having a plurality of entries each comprising a block, a tag store and a stale indicator having a valid condition and a stale condition, said cache receiving address signals representing an address, an address control signal, and a cache control signal over respective lines of said bus, the method comprising the steps of:
- A. receiving the address in response to said address control signal having an asserted condition;
- B. determining if a correspondence exists between said received address signals and the contents of one of said tag stores in response to the coincidence of the first assertion of said cache control signal while said address control signal is asserted;
- C. conditioning the stale indicator of the entry having the positive correspondence to said stale condition in response to a positive correspondence;
- D. generating, from said received address, an incremented address in response to a second assertion of the cache control signal while the address control signal remains asserted;
- E. determining if a correspondence exists between said incremented address and the contents of one of said tag stores in response to the coincidence of a second assertion of said cache control signal while said address control signal is asserted;
- F. conditioning the stale indicators of the entry having the positive correspondence to said stale condition in response to a positive correspondence.

* * * * *

UNITED STATES PATENT AND TRADEMARK OFFICE
CERTIFICATE OF CORRECTION

PATENT NO. : 4,814,981

DATED : March 21, 1989

INVENTOR(S): Paul Rubinfeld

It is certified that error appears in the above-identified patent and that said Letters Patent is hereby corrected as shown below:

Column 1, line 17, "stored" should be --stores--.

Column 2, line 31, delete "the" before "processor".

Column 3, line 66, "location" should be --locations--.

Column 4, line 15, delete "is,".

Column 5, line 40, "D$" should be --DS--.

Column 5, line 55, delete "," after "unit".

Column 6, lines 16-7, "si-ganl" should be --signal--.

Column 7, line 67, insert --a-- after "including".

Column 8, line 23, insert --stale-- before "condition".

Column 8, line 46, insert --for-- before "receiving".

Column 8, line 68, insert --stale-- before "flag".

UNITED STATES PATENT AND TRADEMARK OFFICE
CERTIFICATE OF CORRECTION

PATENT NO. : 4,814,981
DATED : March 21, 1989
INVENTOR(S) : Paul Rubinfeld

It is certified that error appears in the above-identified patent and that said Letters Patent is hereby corrected as shown below:

Column 9, line 31, insert --and-- after "signal".

Column 9, line 34, insert --stale-- before "condition"

Column 9, line 38, insert --,-- after "block".

Signed and Sealed this

Twentieth Day of March, 1990

*Attest:*

JEFFREY M. SAMUELS

*Attesting Officer*  *Acting Commissioner of Patents and Trademarks*